United States Patent [19]

Hewson et al.

[11] 4,182,362

[45] Jan. 8, 1980

[54] DIFFERENTIAL TRANSMITTER AND MANIFOLD MOUNTING

[75] Inventors: John E. Hewson; Marion L. Schomer, both of Houston, Tex.

[73] Assignee: Anderson, Greenwood & Co., Houston, Tex.

[21] Appl. No.: 884,735

[22] Filed: Mar. 9, 1978

[51] Int. Cl.² ............................................. F16K 49/00
[52] U.S. Cl. .................................. 137/340; 137/343; 137/884
[58] Field of Search ............... 137/340, 343, 884, 886, 137/887

[56] References Cited

U.S. PATENT DOCUMENTS

| 2,020,432 | 11/1935 | Parker | 73/205 R |
|---|---|---|---|
| 2,871,881 | 2/1959 | Hewson | 137/886 X |
| 3,596,680 | 8/1971 | Adams | 137/887 X |
| 3,817,283 | 6/1974 | Hewson | 137/884 |
| 3,901,269 | 8/1975 | Henderson | 137/340 |

Primary Examiner—Gerald A. Michalsky
Attorney, Agent, or Firm—Vinson & Elkins

[57] ABSTRACT

A support structure for a differential pressure transmitter and its valve manifold including an angle plate supported from a pipe, fasteners securing the valve manifold to the angle plate and fasteners securing the transmitter to the valve manifold and the method of servicing the transmitter by removing it from the valve manifold without disconnecting the support structure.

10 Claims, 5 Drawing Figures

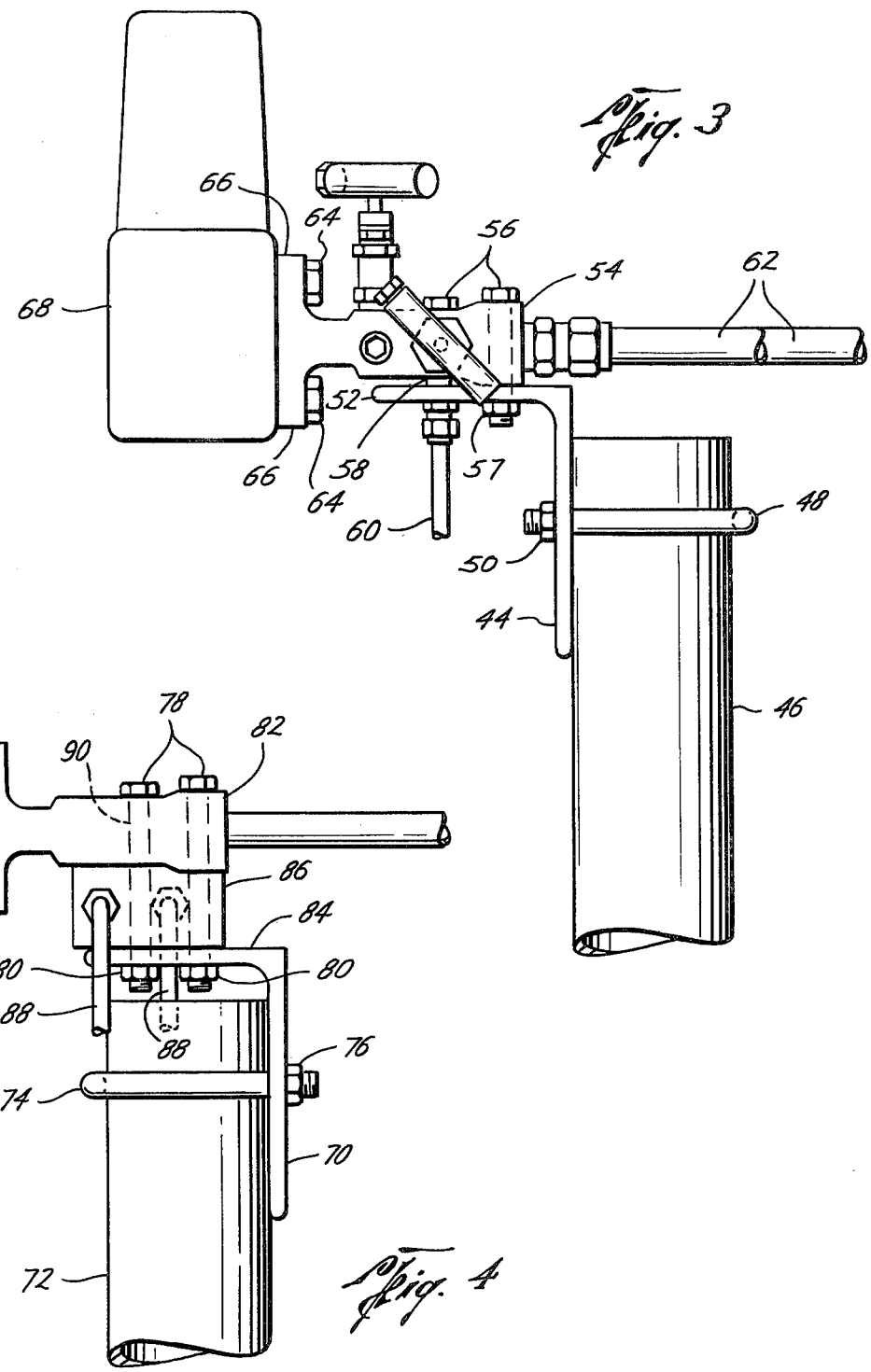

DIFFERENTIAL TRANSMITTER AND MANIFOLD MOUNTING

BACKGROUND

Manifold valves have been used with differential pressure transmitters. In those installations where the transmitter and manifold require separate support, a pipe clamp and support have been connected to the transmitter to provide this support. An example of this prior support is shown in U.S. Pat. No. 2,871,881 issued to John E. Hewson on Feb. 3, 1959, and entitled "Valve Manifold."

While this type of support has been used for many years, it has certain disadvantages. To service the differential pressure transmitter, it had to be disconnected from the support and from the valve manifold. The transmitter was needed to complete the piping installation. When transmitters were installed in the field prior to the completion of construction, they were subject to damage. When the transmitters were removed for servicing, the piping which remains connected to the manifold is subject to being bent since the support has been removed. When servicing one further disadvantage encountered is that both piping and instrument men are involved rather than just instrument men. Also, when piping has been used to connect from the manifold to the transmitter, the liquids in such piping have been spilled on removal of the transmitter.

The foregoing and other disadvantages have been experienced for many years but no structure has been proposed which would eliminate them.

SUMMARY

The present invention relates to an improved support structure for a differential pressure transmitter, a valve manifold and the associated piping and to an improved method of servicing the differential pressure transmitter when it is mounted on the improved support structure.

The improved support structure has a plate adapted to be connected to a vertical or horizontal pipe and to be secured to the valve manifold with the differential pressure transmitter being secured directly to the valve manifold.

An object of the present invention is to provide an improved support structure for a differential pressure transmitter and valve manifold which allows the transmitter to be removed without disconnecting the support structure.

Another object is to provide an improved support structure for a differential pressure transmitter and a valve manifold which provides support for the manifold after the transmitter is removed.

A further object is to provide an improved support structure for a differential pressure transmitter and valve manifold in which the transmitter may be removed without handling the piping.

A still further object is to provide an improved support structure for a differential pressure transmitter and valve manifold which does not have liquid spillage from piping when the transmitter is removed from the support structure.

Still another object is to provide an improved method of servicing a differential pressure transmitter without handling the piping.

BRIEF DESCRIPTION OF THE DRAWINGS

These and other objects and advantages are hereinafter set forth and explained with reference to the drawings wherein:

FIG. 3 is an elevation view of another form of support structure.

FIG. 4 is an elevation view illustrating a support structure with steam tracing for the valve manifold.

DESCRIPTION OF THE PREFERRED EMBODIMENTS

Figure 2:
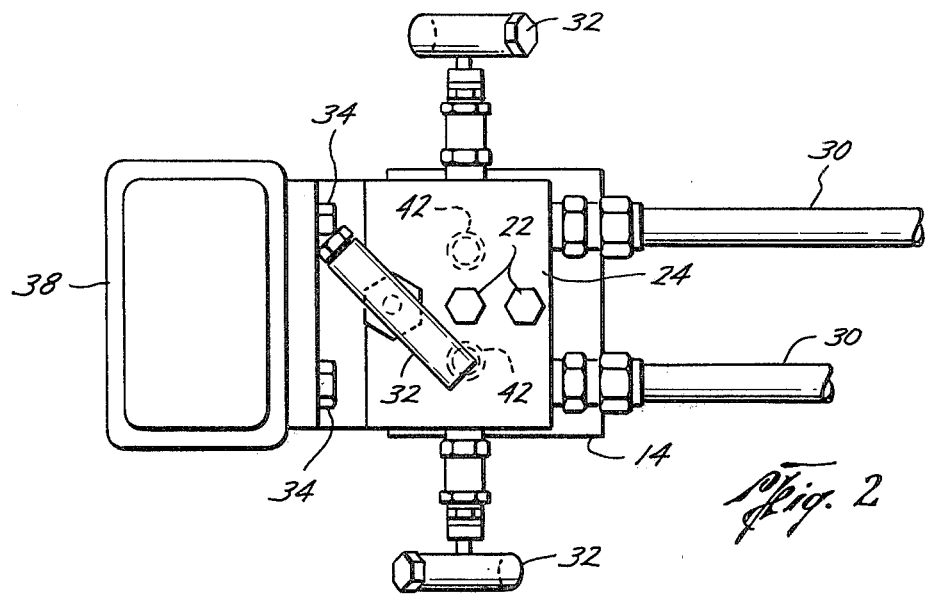
FIG. 2 is a plan view of the apparatus shown in FIG. 1.
Figure 1:
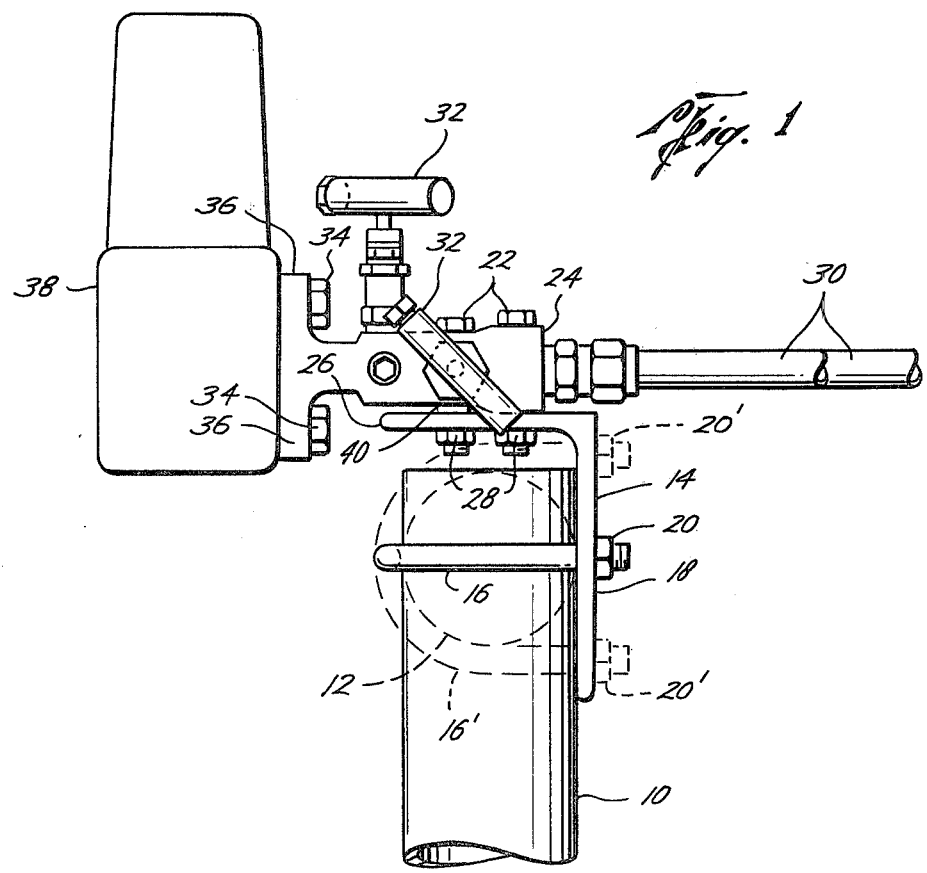
FIG. 1 is an elevation view of one form of the improved support structure of the present invention.

The improved support structure shown in FIG. 1 is connected to a vertical pipe 10 such as a support stand or stand pipe, shown in solid lines, or may be connected, as shown in dashed lines, to a horizontal pipe 12. The angle plate or mounting plate 14 is connected to pipe 10 by the U-bolt 16 which extends around the pipe 10 through leg 18 of plate 14 and is secured by the nuts 20. The U-bolt 16' and nuts 20' are shown to better illustrate the connection to the horizontal pipe 12. The bolts 22 extend through the valve manifold 24 and the leg 26 of plate 14 and are secured by nuts 28 to support the valve manifold. As shown, the leg 26 of plate 14 extends over the top of pipe 10 to provide a rain shield therefor.

The process piping 30 is connected into valve manifold 24 as shown. The valve handles 32 are connected to valves in manifold 24 which control through valve manifold 24. The bolts 34 extend through the flanges 36 of manifold 24 and into differential pressure transmitter or cell 38 to connect transmitter 38 to the support structure. As best seen in FIG. 1, the washers 40 are used around one of bolts 22 to give uniform support to the contoured surface of manifold 24 from the leg 26 of angle plate 14. The manifold 24 is provided with two tapped openings 42 for a purge connection.

The support structure shown in FIG. 3 includes the same components as previously described and shown but the angle plate 44 is secured to the pipe 46 by the U-bolt 48 and nuts 50 so that its horizontal leg 52 extends away from pipe 46 rather than over it as shown in FIG. 1. Valve manifold 54 is secured to leg 52 by bolts 56 and nuts 57 with the washers 58 being used for uniform support. With this mounting of valve manifold 54, the purge connection 60 can be made without interference with the pipe 46. The process piping 62 connects into one side of manifold 54 and the bolts 64 extend through manifold flange 66 to secure the differential pressure transmitter 68 to the support structure.

The modified form of support structure illustrated in FIG. 4 is similar to that shown in FIG. 1 with the angle plate 70 being secured to the pipe 72 by the U-bolt 74 and nuts 76, and the bolts 78 and nuts 80 secured the valve manifold 82 to the leg 84 of angle plate 70. In this form of structure, the steam trace block 86 is interposed between the leg 84 and the manifold 82. Block 86 is contoured to fit closely with valve manifold 82 and has steam lines 88 connecting thereto for the delivery and discharge of steam from the block 86. This steam trace block 86 provides both heat for the valve manifold 82 and also a uniform support. Block 86 is preferred to be brass or carbon steel. Also, it is preferred that a heat transfer cement be used between the engaging surface of valve manifold 82 and block 86. While block 86 is illustrated as having steam as the source of heating, any other type of heat source may be used with block 86. When the block 86 is used, the tapped openings 90 are formed in the upper surface of valve manifold 82 for a purge connection. In FIG. 4, the valve handles and stems are not shown but are understood to be as usually located in other similar manifolds.

Figure 5:
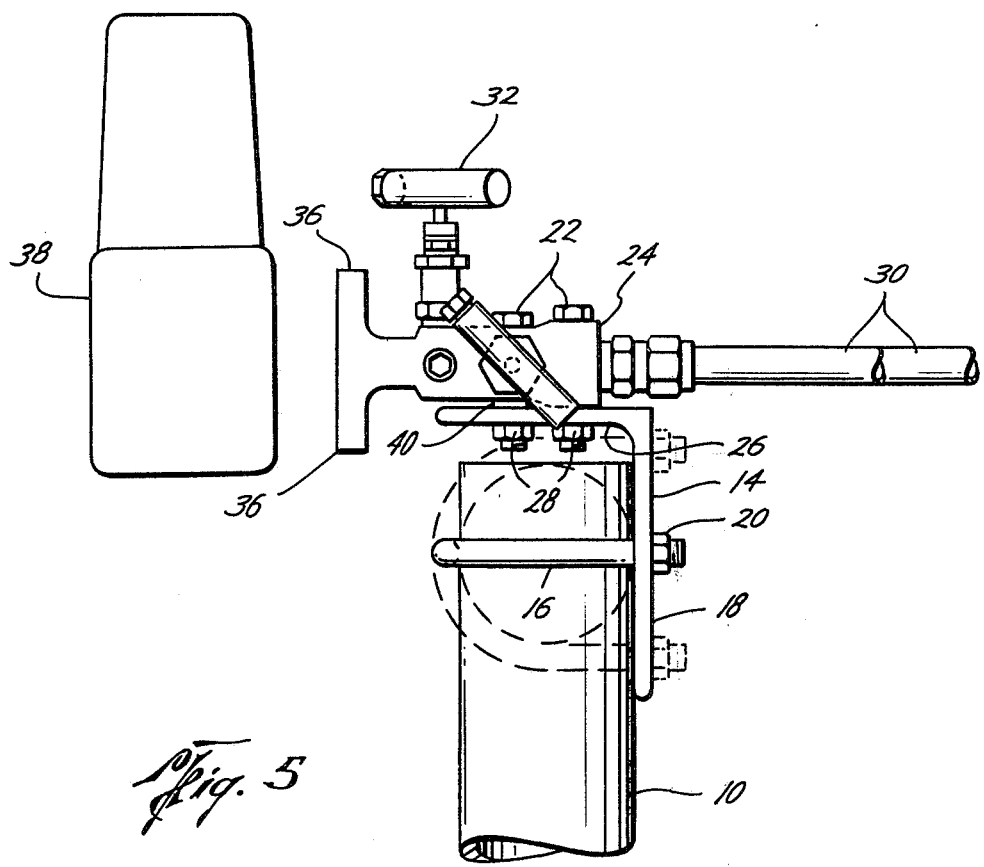
FIG. 5 illustrates the removal of the differential pressure transmitter.

The removal of the differential pressure transmitter 38 is accomplished as shown in FIG. 5 by the removal of the bolts 34. This can be done by the instrument man and he does not require the assistance of the trade person having the responsibility for the piping. As can be seen in FIG. 5, the transmitter 38 has been removed and the valve manifold 24 together with the process piping 30 are still completely supported so that no damage should occur to the manifold 24 or the piping 30. Once the transmitter 38 has been serviced, it is reinstalled on the manifold 24 by use of bolts 34.

From the foregoing it can be seen that the improved support structure allows all of the piping installation to be completed independent of the transmitter and it is adequately supported with the transmitter installed and removed.

What is claimed is:

1. A support structure for mounting a differential pressure transmitter, a valve manifold and the related process piping from a support stand comprising,
   a mounting plate,
   fastening means for securing said mounting plate to a support stand, and
   fastening means for securing the valve manifold to said mounting plate,
   a first side of said valve manifold being connected to process piping and a second side of said valve manifold being connected to the transmitter,
   said transmitter and said process piping being independently removable and connectable from and to said valve manifold without disturbing the mounting of said valve manifold on said support stand.

2. A support structure according to claim 1 including a heat exchange block positioned between said mounting plate and said valve manifold.

3. A support structure according to claim 2 including a heat transfer cement between engaging surfaces of said block and said valve manifold.

4. A support structure according to claim 1 wherein said support stand extends vertically.

5. A support structure according to claim 1 wherein said support stand extends horizontally.

6. A support structure according to claim 1, wherein said mounting plate is an angle plate and one leg of the angle plate extends over the support stand.

7. A support structure according to claim 1, wherein said mounting plate is an angle plate having two legs with the valve manifold being fastened to one of said legs which leg extends away from said support stand, and
   a purge connection to said valve manifold extending through the leg of the mounting plate to which the manifold is fastened so that the purge connection is free of the support stand.

8. A support structure according to claim 6 or 7 wherein said mounting plate fastening means includes
   a U-bolt extending partially around the support stand and extending through one leg of said mounting plate, and
   nuts on the ends of said U-bolt extending through said mounting plate.

9. A support structure according to claim 6 wherein said mounting plate includes a leg having holes therein for receiving said U-bolt in position around a vertical pipe and around a horizontal pipe.

10. A support structure for a differential pressure transmitter, comprising
    a manifold having a pair of opposed faces,
    means for connecting a differential pressure transmitter to one of said opposed faces,
    means for connecting process piping to the other of said opposed faces,
    flow passages extending between said opposed faces,
    valve means in said flow passages to control flow through said flow passages, and
    support means for supporting said valve manifold,
    said process piping and said differential pressure transmitter being independently removable from said manifold and being free of obstruction from said support means.

* * * * *